June 9, 1964  W. A. JAATINEN ETAL  3,136,915
HIGH ENERGY PLASMA SOURCE
Filed April 19, 1962  3 Sheets-Sheet 1

INVENTORS.
WALTER A. JAATINEN,
RAYMOND M. CHAPPEL &
BY WILFRED R. COOK their ATTORNEYS.

3,136,915
HIGH ENERGY PLASMA SOURCE

Walter A. Jaatinen, Hackensack, Raymond M. Chappel, Whippany, and Wilfred R. Cook, East Orange, N.J., assignors, by mesne assignments, to Sheer-Korman Associates, Inc., New York, N.Y., a corporation of Delaware
Filed Apr. 19, 1962, Ser. No. 188,705
12 Claims. (Cl. 313—231)

This invention relates to high energy plasma sources and more particularly to electric arc configurations for producing high energy plasma radiation, such as, for example, a high brilliancy light source for use in search lights, solar simulator devices, hypo-thermal environment generators, plasma propulsion devices and the like.

The specific electric arc configuration disclosed in this invention provides for a unique high intensity operation which was heretofore unavailable. The electric arc configuration, generally shown in the drawings, consists of a centrally disposed negatively charged cathode surrounded concentrically by a positively charged anode in which openings are provided for passing transient fluid or solid particles suspended in fluid. The cathode is axially positioned in front of the anode so that the fluid emerging from a frontal annular emitting surface of the anode passes through a region directly adjacent to, and in a direction generally parallel to, the side surface of the cathode. The terminus end of the negatively charged cathode is sharpened so as to concentrate the charge and cause an electric arc to discharge between that point and the frontal annular emitting surface of the anode. This electric arc thus passes colinearly along the same path as the fluid transpiring from the emitting surface of the anode. Thus this invention provides for a conductive path which overlaps the flow path of the transpiration gas, thereby exposing emerging fluid to the flow of electrons, energizing them and producing a high energy plasma.

It is a feature of this invention that energized fluid is focused by the converging conical flow to form a zone of high energy concentration at the sharpened end of the cathode, which, for example, may be the point end in a conical configuration. The high energy density region exists at this point by virtue of the convergence of the arc current upon the cathode. Hence, a geometric configuration which positions a sharpened cathode area in advance of a concentric anode, provides a unique method for generating plasmas, concentrating the energy of the plasmas into a common focus, and in general for providing a concentrated source of radiant energy. In addition, a concentric arrangement of the cathode and anode allows the generator plasma to be so disposed as to be easily incorporated into systems employing refractive and reflective elements.

It is a further feature of this invention that the fluid flow rate and the power input may be varied during the arcing operation. In addition, this invention provides a configuration wherein the projecting cathode may be displaced forwardly or rearwardly away from the frontal surface of the anode. These controlled variations in the position of the cathode, power input and fluid flow rate and other features disclosed in this invention, permit continuous adjustment of the shape, size, uniformity, stability and energy content of the plasma.

This invention has been extensively tested under various operating conditions. It has operated, successfully, generating radiant plasmas in vacuum and 0–500 pounds per square inch gauge ambient gas pressure at power levels of 3–40 kilowatts. In operation it has exhibited remarkable reliability in the generating of stable plasmas. Furthermore, in regard to light intensity, it has generated a peak brightness of 5,000 candles per square millimeter at a chamber pressure of 300 p.s.i.g. of argon gas at a power input of 14 kilowatts. Still further, it should be noted that the scope of this invention is not limited to any portion of the spectrum and that while the brightness measurements made in these tests relate only to the visual portion, considerable energy was found to exist in the ultra-violet and the infra-red ranges as well.

It is thus apparent that this invention substantially advances the art by providing novel means for producing high energy stable plasma which has innumerable uses such as the creation of extremely high brightness conditions.

A fuller understanding of this invention may be had by referring to the following detailed description and claims taken in conjunction with the accompanying drawings in which:

Figure 1:
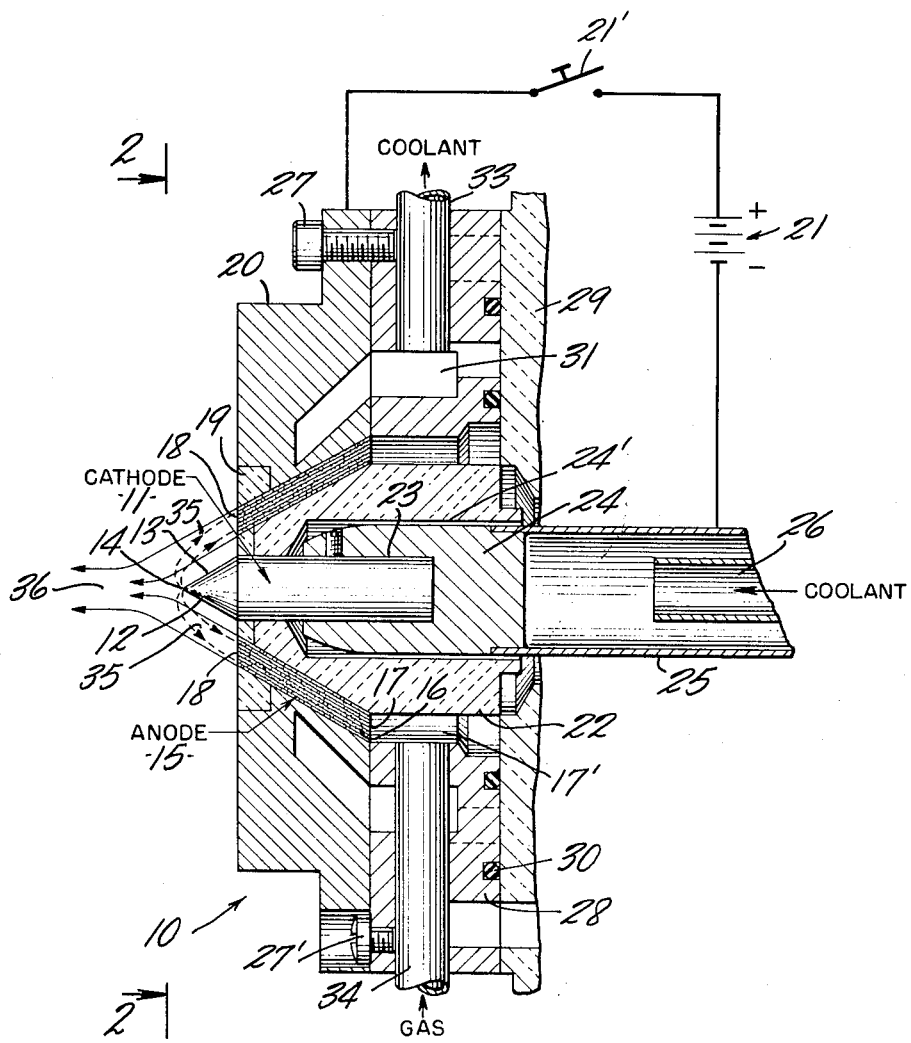
FIGURE 1 shows a cross section of one embodiment of the high energy plasma source of the invention as seen alone the line 1—1 of FIGURE 2.
Figure 2:
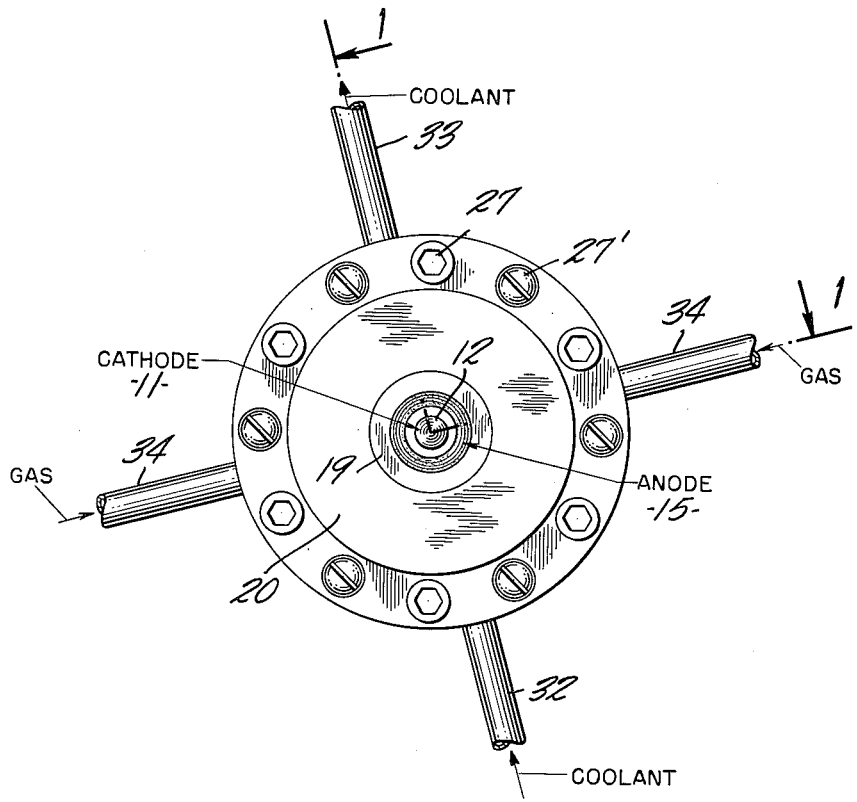
FIGURE 2 is a front end view of FIG. 1 as seen from the plane 2—2 and showing the concentric arrangement of the principal parts.

With reference to FIGURES 1 and 2 of the drawing, the invention is illustrated as being incorporated into a cylindrical type of gas emitting high energy plasma source and indicated generally by the reference character 10. As illustrated in detail, the radiation source 10 comprises a cylindrical cathode 11 having a conical portion 12. The side surface 13 of this conical portion 12 of cathode 11 tapers divergingly from a forward cathode point 14 to a rearwardly disposed anode 15.

This anode 15, in a shape of a hollow truncated cone, is shown in FIGURE 1 as surrounding cathode 11 and lying behind or to the right of the base of conical cathode portion 12. Longitudinal openings or channels 16 throughout anode 15 transmit gas entering surface 17 through the anode 15 to emitting surface 18, i.e., from right to left as seen in FIGURE 1. These openings or channels 16 may be provided by forming the anode 15 of conductive porous refractory material such as molded carbon or sintered tungsten particles or by providing a solid conductive anode with small drilled or molded channels 16 scattered longitudinally therethrough. The axes of the machined or molded openings 16 at the emitting surface 18 may be parallel to, but slightly outward and away from, the tapering side surface 13 of cathode 11.

Insulating anode 15 from cathode 11 and positioned behind or to the right of its conical portion 13 is a ring 19 of high temperature resistant insulating material such as boron nitride. Also surrounding and electrically connected to anode 15 is a ring-shaped copper anode holder 20 which, in turn, is connected to the positive side of an electrical source shown symbolically at 21, the circuit between cathode and anode being controlled by switch 21'.

A tubular refractory pressure plug 22, which also may be composed of boron nitride, is interposed between anode 15 and cathode 11, and thus surrounds and positions cathode 11, insuring the electrical separation of the cathode 11 from anode 15. The cylindrical end of cathode 11 is seated and locked in a recess 23 formed in one end of a copper plug 24 which, in turn, is slidably seated within a recess 24' in pressure plug 22. The copper plug 24 is mounted on the end and forms part of tubular copper cathode holder 25 through which is circulated by pipe 26 a suitable coolant, such as water. The cathode holder 25 is connected to the negative side of power source 21.

The anode holder 20 and cathode assembly just described are secured by bolts 27 and 27' to a thermally conducting ring 28 which is, in turn, secured to a suitable insulating mount or support 29 partially shown in FIGURE 1. Water and gas flowing within ring 28 are tightly sealed therein by gasket 30. Communicating circular grooves in the facing surfaces of holder 20 and ring 28 jointly form a cooling passage 31 through which a suitable coolant, such as water, is circulated, entering passage 31 through pipe 32 and discharging through pipe 33 shown in FIGURE 2. Similarly, the gas supply pipes 34 lead to the annular chamber 17′, through which the longitudinal anode openings or channels 16 are supplied at anode surface 17.

In operation of the high energy plasma source depicted by FIGS. 1 and 2, the electrical circuit between anode 15 and cathode 11 is closed by switch 21 and transient gas is introduced to anode 15 at surface 17 from annular chamber 17′, supplied by one or more supply pipes 34, and thereafter proceeds through the small longitudinal openings or channels 16 to frontal annular emitting surface 18. Emerging from the open ends of channels 16 in surface 18 of anode 15, the transient gas moves into a region adjacent to tapering side surface 13 converging to cathode point 14 where it is concentrated and focused to form a pencil-like zone of high energy concentration at the tip of the conical cathode 14 and indicated generally at 36 as lying between the solid arrows in FIGURE 1. Electrical means 21 following an initial breakdown of the conductive path by external means (not shown), causes an umbrella-like arc discharge indicated at 35, to lie in the zone defined by the dotted arrows and extending between positively charged anode 15 and negatively charged cathode 11. The stream of electrons flowing in this conductive path toward the anode surface is substantially in colinear alignment with the path of the emitted transient gas, thereby being approximately parallel to the conical side surface of cathode 11 and energizing the gas in this region to a substantially high degree.

A specific example of one of the many applications of this device is provided by a laboratory experiment which measures the brightness produced by the conical nozzle configuration.

In substantially vacuum conditions this configuration produces approximately 100 candle power per square millimeter. Thereafter, as the pressure is increased in a totally argon medium, the peak brightness increases to about 300 candle power per square millimeter at a chamber pressure of 30 pounds per square inch gauge. At this point approximately 7.5 kilowatts maintain arcing in the conical configuration.

The conical-arc continues to produce increased peak brightness at higher chamber pressure; i.e., at 265 pounds per square inch and at only a 12 kilowatts input, a peak brightness of approximately 3800 candle power per square inch is produced; likewise, at 300 pounds per square inch gauge of argon gas and with only a 14 kilowatts input, a peak brightness of 4900 candle power per square millimeter is produced.

In this specific use and in many other varied applications, the device of this invention causes maximum excitation of the gas in the umbrella-arc electrical discharge 35 and provides a concentrated focused source of radiant energy.

Figure 3:
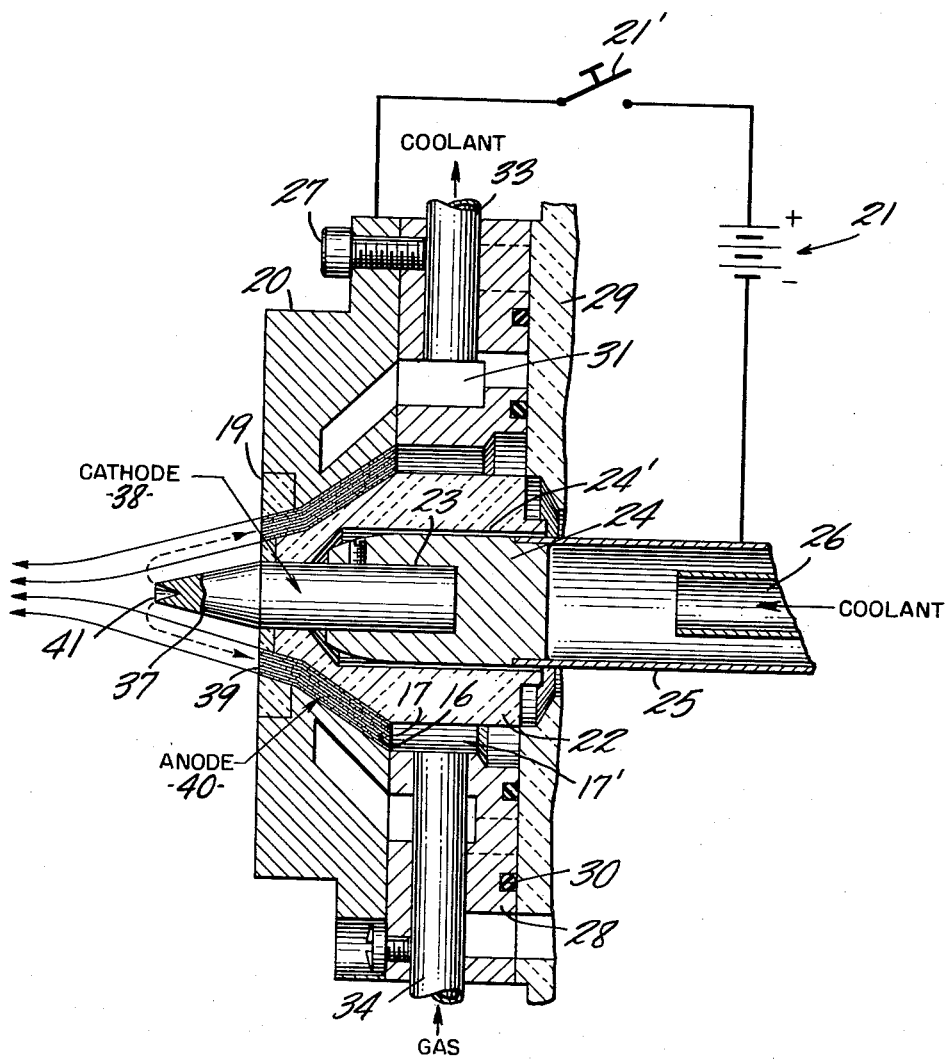
FIGURE 3 shows a cross sectional view similar to FIG. 1 of another embodiment of the invention.

The focal point of the concentration of the energy source may be varied by changing the angle formed between the tapering conductive path and the longitudinal axis of the cathode 11. An example of this focal variation is shown in FIGURE 3, which is like FIGURE 1 in that the outer conical surface 37 of cathode 38 extends beyond the emitting surface 39 of anode 40. The tip of conical cathode portion 37 is recessed to form an outer rim 41 which is sharpened to provide for the concentration of negative charge, thus establishing in this embodiment a circumferential electrical concentration of charge.

The transient gas emitting from the outer ends of the longitudinal channels in anode surface 39 proceeds through the region adjacent to outer conical cathode surface 37 in a direction converging slightly toward the longitudinal axis of the cathode 38. Similar to the embodiment depicted in FIGURE 1, the concentration of negative charge around the cathode rim 41 causes an electrical arc discharge between the points on the rim 41 and the emitting surface 39 of anode 40. Thus as in the embodiment of FIGURE 1, this configuration increases the region of excitation of the gas and provides an area of higher intensity radiation. The configuration variation presented in FIGURE 2 is to be distinguished, nevertheless, from the first embodiment in that it creates a distinct plasma formation and concentration of the energized gas.

Other embodiments are envisioned where fluid may be passed through openings in both the cathode and the anode.

Although this invention has been described with a certain degree of particularity, it is to be understood that the two embodiments described herein have been made only by way of example and that numerous changes in the details of construction and the combination and arrangement of parts may be resorted to without departing from the spirit and scope of the invention as hereafter claimed.

We claim:

1. Apparatus for providing a high energy plasma source comprising
   a cathode having a forward area facing generally in a forward direction and at least one tapering side surface,
   an anode positioned behind said side surface of said cathode and having a frontal surface facing in said forward direction,
   means for introducing a fluid in the region adjacent said side tapering surface of said cathode, and
   electrical means for causing an arc to be formed between said forward end of said cathode and said frontal surface of said anode substantially adjacent and parallel to said tapering side surface of said cathode.

2. Apparatus for providing a high energy plasma source comprising
   a cathode having a forward end facing generally in a forward direction and having at least one tapering side surface,
   an anode surrounding said cathode, positioned behind said tapering side surface of said cathode, and having a frontal annular surface facing in said forward direction,
   means for introducing a fluid in the region adjacent said side tapering surface of said cathode, and
   electrical means for causing an arc to be formed between said forward end of said cathode and said frontal annular surface of said anode substantially forming an umbrella-arc discharge parallel to said tapering side surface of said cathode.

3. Apparatus for providing a high energy plasma source comprising
   a cathode having a forward sharpened end and at least one tapering side surface diverging behind said forward sharpened end,
   an anode positioned behind said tapering side surface of said cathode having a frontal surface facing fluid located in a region adjacent said tapering side surface of said cathode, and
   electrical means for causing an arc to be formed between said forward sharpened end of said cathode and said frontal surface of said anode, substantially parallel to said tapering side surface of said cathode and forming a zone of high energy concentration about said forward sharpened area of said cathode.

4. Apparatus for providing a high energy plasma source as described in claim 3 wherein
   said forward sharpened end of said cathode is a sharpened annular rim.

5. Apparatus for providing a high energy plasma source comprising
a conical cathode having a forward point end facing generally in a forward direction and a tapering side surface diverging behind said forward point end,
an anode surrounding said conical cathode and positioned behind said tapering side surface of said cathode and having an annular frontal surface facing in a forward direction and facing fluid in a region adjacent the tapering side surface of said conical cathode, and
electrical means for causing an arc extending between said forward point end of said conical cathode and said annular frontal surface of said anode substantially parallel to said tapering side surface of said cathode and forming a zone of high energy concentration about said forward sharpened point end of said cathode.

6. Apparatus for providing a high energy plasma source comprising
a cathode having a forward end facing generally in a forward direction and at least one tapering side surface,
an anode positioned behind said tapering side surface of said cathode, having openings throughout for transmitting fluid and having a frontal emitting surface facing in said forward direction and positioned for emitting said fluid into a region adjacent to said side tapering surface of said cathode, and
electrical means for causing an arc to be formed between said forward end of said cathode and said frontal emitting surface of said anode substantially adjacent and parallel to said tapering side surface of said cathode.

7. Apparatus for providing a high energy plasma source as described in claim 6 wherein
said anode is made from porous conductive material.

8. Apparatus for providing a high energy plasma source as described in claim 6 wherein
said anode is made from conductive material and channeled longitudinally.

9. Apparatus for providing a high energy plasma source as described in claim 6 wherein the cathode and anode are concentrically mounted on a support and relatively axially adjustable.

10. Apparatus for providing a high energy plasma source comprising
a cathode having a forward end facing generally in a forward direction and at least one tapering side surface diverging behind said forward end,
an anode surrounding said cathode and positioned behind said tapering side surface of said cathode and having openings throughout for transmitting fluid and having a frontal annular emitting surface facing in said forward direction and positioned for emitting said fluid into a region adjacent to said side surface of said cathode, and
electrical means for causing an arc to be formed between said forward end of said cathode and said frontal annular emitting surface of said anode substantially parallel to said tapering side surface of said cathode.

11. Apparatus for providing a high energy plasma source comprising
a conical cathode having a forward point end facing generally in a forward direction and a tapering side surface diverging behind said point end,
a truncated anode cone having a hollow center surrounding said conical cathode, positioned behind said tapering side surface of said cathode, having openings throughout for transmitting fluid and having a forward annular surface facing in said forward direction for emitting fluid into a region adjacent to said side surface of said conical cathode, and
electrical means for causing an arc to be formed between said point end of said conical cathode and all points on said forward annular surface of said anode surrounding and positioned behind said cathode, substantially parallel to said side surface of said conical cathode and forming a zone of high energy concentration about said forward point end of said conical cathode.

12. Apparatus for providing a high energy plasma source comprising
a conical cathode having a forward point end and facing a forward direction, and having a tapering side surface diverging behind said forward point end,
a truncated anode cone having a hollow center, concentrically mounted about but insulated from and positioned behind said cathode, having inner and outer conical tapering side surfaces parallel to each other and parallel to but positioned behind said tapering side surface of said cathode, having longitudinal openings throughout for transmitting fluid and having a frontal annular emitting surface facing in said forward direction for emitting fluid parallel to said tapering side surface of said cathode and for concentrating said fluid at said forward point end of said conical cathode, and
electrical means for causing an electrical arc extending between said forward point end of said conical cathode and said frontal annular emitting surface of said anode cone substantially parallel to said conical side surface of said conical cathode.

No references cited.